(12) United States Patent
Aronson

(10) Patent No.: US 10,462,139 B2
(45) Date of Patent: *Oct. 29, 2019

(54) SCALABLE UNIVERSAL FULL SPECTRUM CYBER CYBER DETERMINING PROCESS

(71) Applicant: Jeffry David Aronson, San Antonio, TX (US)

(72) Inventor: Jeffry David Aronson, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/456,542

(22) Filed: Mar. 12, 2017

(65) Prior Publication Data

US 2019/0141040 A1    May 9, 2019

Related U.S. Application Data

(63) Continuation-in-part of application No. 15/071,075, filed on Mar. 15, 2016, now Pat. No. 9,635,025,
(Continued)

(51) Int. Cl.
*H04L 29/06* (2006.01)
*G06F 21/40* (2013.01)
(Continued)

(52) U.S. Cl.
CPC ............. *H04L 63/10* (2013.01); *G06F 21/32* (2013.01); *G06F 21/40* (2013.01); *G06Q 10/10* (2013.01)

(58) Field of Classification Search
CPC ..... H04L 63/10; H04L 63/0861; G06Q 10/06; G06Q 10/10; G06F 21/32; G06F 21/40
See application file for complete search history.

(56) References Cited

U.S. PATENT DOCUMENTS

| 6,208,247 B1* | 3/2001 | Agre | G01V 1/223 340/13.25 |
| 2007/0288208 A1* | 12/2007 | Grigsby | G06Q 10/06 703/2 |

(Continued)

OTHER PUBLICATIONS

Linda et al., Towards Resilient Critical Infrastructures: Application of Type-2 Fuzzy Logic in Embedded Network Security Cyber Sensor, Sep. 2011, 4th International Symposium on Resilient Control Systems, pp. 26-32 (Year: 2011).*

*Primary Examiner* — Kenneth W Chang
(74) *Attorney, Agent, or Firm* — John A. Fortkort; Fortkort & Houston PC

(57) ABSTRACT

A scalable universal full spectrum cyber determining process for accurately and reliably determining and reporting at least one cyber determination from a full spectrum of possible cyber determinations. Utilizing cyber resources and predetermined criteria for providing cyber determinations regarding at least one subject of at least one observation, the cyber determining process: provides cyber determinations for any possible subject of an observation; provides for the utilization of any selected attainable level of accuracy, up to and including 100% accuracy; provides for single, intermittently performed, and constantly performed cyber determinations; utilizes available cyber resources; interacts with itself and utilized cyber resources to perform possible functions; recognizes characteristics from cyber observations and then utilizes recognized characteristics for comparing or determining; provides and utilizes standard designations for representing aspects of itself and its operations; utilizes useful information or outcomes from comparing for making determinations; and, reports on any aspect of its operations at any time.

21 Claims, 3 Drawing Sheets

Related U.S. Application Data which is a continuation-in-part of application No. 14/857,445, filed on Sep. 17, 2015, now Pat. No. 9,319,414, which is a continuation-in-part of application No. 14/316,196, filed on Jun. 26, 2014, now Pat. No. 9,166,981, which is a continuation of application No. 13/784,277, filed on Mar. 4, 2013, now Pat. No. 8,769,649, which is a continuation of application No. 13/688,925, filed on Nov. 29, 2012, now Pat. No. 8,434,136.

(51) Int. Cl.
*G06F 21/32* (2013.01)
*G06Q 10/10* (2012.01)

(56) References Cited

U.S. PATENT DOCUMENTS

| | | | | |
|---|---|---|---|---|
| 2009/0072965 | A1* | 3/2009 | Staab | G06Q 10/06 340/539.11 |
| 2009/0074184 | A1* | 3/2009 | Baum | H04L 12/2809 380/205 |
| 2009/0254971 | A1* | 10/2009 | Herz | G06Q 10/10 726/1 |
| 2012/0096549 | A1* | 4/2012 | Amini | H04L 63/1433 726/23 |

* cited by examiner

SCALABLE UNIVERSAL FULL SPECTRUM CYBER CYBER DETERMINING PROCESS

CROSS-REFERENCE TO RELATED APPLICATIONS

This application is a continuation-in-part application of U.S. patent application Ser. No. 15/071,075, filed Mar. 15, 2016, entitled SCALABLE UNIVERSAL FULL SPECTRUM CYBER DETERMINING MACHINE, having the same inventor, now allowed, which is incorporated herein by reference in its entirety; which application is a continuation-in-part application of U.S. patent application Ser. No. 14/857,445, filed Sep. 17, 2015, issued as U.S. Pat. No. 9,319,414 on Apr. 19, 2016, entitled SCALABLE FULL SPECTRUM CYBER DETERMINATION PROCESS, having the same inventor, which is incorporated herein by reference in its entirety; which application is a continuation-in-part application of U.S. patent application Ser. No. 14/316,196, filed Jun. 26, 2014, issued as U.S. Pat. No. 9,166,981 on Oct. 20, 2015, entitled FULL SPECTRUM CYBER IDENTIFICATION DETERMINATION PROCESS, having the same inventor, which is incorporated herein by reference in its entirety; which application is a continuation of U.S. patent application Ser. No. 13/784,277, filed Mar. 4, 2013, issued as U.S. Pat. No. 8,769,649 on Jul. 1, 2014, entitled FULL SPECTRUM CYBER IDENTIFICATION DETERMINATION PROCESS, having the same inventor, which is incorporated herein by reference in its entirety; which application is a continuation of U.S. patent application Ser. No. 13/688,925, filed Nov. 29, 2012, issued as U.S. Pat. No. 8,434,136 on Apr. 30, 2013, entitled FULL SPECTRUM CYBER IDENTIFICATION DETERMINATION PROCESS, having the same inventor, which is incorporated herein by reference in its entirety.

FIELD OF THE DISCLOSURE

The present disclosure relates generally to a scalable universal full spectrum cyber determining process, and more particularly to a scalable universal full spectrum cyber determining process that utilizes at least one computing device, predetermined criteria, cyber resources and sensor observations or information for providing at least one cyber determination from a full spectrum of cyber determinations.

BACKGROUND OF THE DISCLOSURE

Cybersecurity is the protection of cyber resources, including the hardware, the software and the information stored in the hardware or software, from theft or malicious damage thereto. Cybersecurity typically entails controlling access to cyber resources in order to prevent malicious disruption or misdirection of the services or of the information those cyber resources provide.

Cybersecurity has become increasingly important as the world has become increasingly reliant on cyber resources. Moreover, with the advent of the Internet of Things, networks have become increasingly complex. Hence, in addition to various types of personal computers and smart phones, networks have come to include almost any device which can be embedded with electronics, programming, sensors and network connectivity. The increasing importance of cyber systems has made cybersecurity more critical, while the increasing complexity of cyber systems has made cybersecurity increasingly challenging. Together, these factors have made existing cybersecurity measures increasingly inadequate.

At the heart of most cybersecurity failures is the complete inability of computers and cyber resources to accurately determine the identity of a person prior to allowing that person to gain access to cyber resources. Utilizing a cyber determining process for accurately determining a person's identity is an indispensable part of putting an end to the cybersecurity failures that now plague cyberspace. Accurately determining a person's identity is just one determination from the full spectrum of cyber determinations that may be provided by the scalable universal full spectrum cyber determining process of this disclosure.

SUMMARY OF THE DISCLOSURE

In one aspect, a scalable universal full spectrum cyber determining process is provided which comprises the utilization of (a) at least one computing device, (b) criteria selected from criteria that may be utilized by the cyber determining process, (c) selected information, (d) selected necessary programming, and (e) any other necessary resource, all of which being structured and utilized for providing at least one cyber determination;

wherein the at least one cyber determination is selected from the group consisting of a full spectrum of cyber determinations;

wherein the at least one cyber determination is utilized for at least one purpose selected from the group consisting of a full spectrum of purposes for which cyber determinations may be utilized;

wherein the information is derived from at least one member selected from the group consisting of (a) at one or more points in time, and (b) over at least one period of time;

wherein the information is selected from the group consisting of a full spectrum of useful information that may be utilized by the cyber determining process;

wherein the full spectrum of useful information that may be utilized by the cyber determining process may include information that was derived from at least one sensor observation;

wherein the at least one sensor observation provides information regarding at least one aspect of at least one subject of the at least one sensor observation;

wherein at least one cyber determination regarding the at least one subject of at least one sensor observation is selected from the group consisting of the full spectrum of cyber determinations regarding subjects of sensor observations;

wherein the at least one aspect of at least one subject of at least one sensor observation is selected from the group consisting of the full spectrum of observable aspects of subjects of sensor observations;

wherein the at least one subject of at least one sensor observation is selected from the group consisting of the full spectrum of subjects of sensor observations;

wherein the cyber determining process utilizes at least one observed characteristic regarding at least one aspect of the at least one subject of at least one sensor observation;

wherein the at least one observed characteristic is selected from the group consisting of the full spectrum of observable characteristics of subjects of sensor observations;

wherein the at least one sensor observation is at least one type of sensor observation selected from the group consisting of (a) visual sensor observations, (b) audible sensor observations, (c) thermal sensor observations, (d) olfactory sensor observations (e) tactile sensor observations, and (f) any other type of sensor observation selected from the group consisting of a full spectrum of types of sensor observations;

wherein the at least one sensor observation has at least one characteristic selected from the group consisting of a full spectrum of characteristics of sensor observations;

wherein each scalable cyber determining process may be configured, in regard to included resources, to fall at one point in the range of from a minimum to a maximum, wherein at the minimum the cyber determining process includes only the resources that are needed for providing for the least complex, in regard to included necessary resources, of all cyber determination needs, and wherein at the maximum the cyber determining process includes all of the resource that are needed for providing every cyber determination from a full spectrum of cyber determinations;

wherein the scalable cyber determining process may determine and utilize at least one measure of adequacy of available resources;

wherein the scalable cyber determining process provides at least one determination selected from the group consisting of (a) at least one single cyber determination, (b) at least one intermittently provided cyber determination, and (c) at least one constantly provided cyber determination; and wherein the scalable cyber determining process further comprises utilizing at least one part of at least one step selected from the group consisting of (a) a first series observation step wherein the cyber determining process utilizes at least one sensor observation, wherein at least one subject of the at least one sensor observation has at least one previously determined aspect, the cyber determining process recognizing at least one characteristic regarding the previously determined aspect, the at least one recognized characteristic being utilizable by the cyber determining process in providing the at least one cyber determination, the cyber determining process assigning designations representing (i) the at least one observation, (ii) the at least one known aspect of the at least one observation subject, and (iii) the at least one observed characteristic, the cyber determining process including at least one of the designation in at least one first series observation record, (b) a second series observation step wherein the cyber determining process utilizes at least one sensor observation, wherein at least one subject of the at least one sensor observation has at least one yet-to-be-determined aspect, the cyber determining process recognizing at least one characteristic regarding the at least one yet-to-be-determined aspect, the cyber determining process assigning designations representing (i) the at least one observation, (ii) the at least one yet-to-be-determined aspect of the at least one observation subject, and (iii) the at least one characteristic regarding the at least one yet-to-be-determined aspect, wherein the cyber determining process including at least one of the designations in at least one second series observation record, (c) a matching step wherein the cyber determining process matching at least one designation from at least one second series observation record with at least one comparable designation from at least one first series observation record, (d) a comparing step wherein the cyber determining process comparing designations from at least one second series observation record with designations from at least one comparable first series observation record and providing at least one conclusion from the comparison, (e) a determining step wherein the cyber determining process utilizes at least one member selected from the group of (i) the at least one conclusion from the at least one comparing step, and (ii) the useful information, for making the at least one cyber determination, and (f) a reporting step wherein the cyber determining process providing at least one report regarding at least one aspect of at least one part of at least one cycle of operation of the cyber determining process.

In some embodiments of the foregoing cyber determining process, the scalable cyber determining process achieves at least one selected attainable level of accuracy goal for at least one cyber determination, wherein the at least one attainable level of accuracy goal falls within the range extending from 0% accuracy up to, and including, 100% accuracy.

In some embodiments of the foregoing cyber determining process, the cyber determining process provides for any possible level of observation participation by at least one person who is at least one subject of at least one sensor observation, and wherein the any possible level of observation participation ranges from the at least one person being present but not consciously or otherwise engaged in the at least one sensor observation, to the at least one person being an active and consciously engaged participant in the at least one sensor observation.

In some embodiments of the foregoing cyber determining process, the cyber determining process utilizes at least one sensor observation selected from the group consisting of (a) at least one sensor observation which is of at least one characteristic of at least one observation subject, and which is observed at one or more points in time, and (b) at least one sensor observation which is of at least one characteristic of at least one observation subject, and which is observed over at least one period of time.

In some embodiments of the foregoing cyber determining process, the at least one sensor observation occurs over the at least one period of time and includes observation of at least one change that occurs to at least one sensor observable aspect of at least one observation subject over the at least one period of time.

In some embodiments of the foregoing cyber determining process, the at least one subject of at least one sensor observation includes at least one person being the at least one observation subject, and wherein the at least one change that occurs to the at least one observation subject is at least one change of at least one observable aspect of at least one part of at least one feature of the at least one person.

In some embodiments of the foregoing cyber determining process, at least one feature of the at least one person is selected from the group consisting of the head, face, mouth, eyes, eyebrows, nose, arms, hands, fingers, legs, feet, neck, torso, skin, heart, stomach, intestines, liver, kidneys, lungs, breath, vascular system, brain, spinal cord, neural system, skeleton, blood, and any other feature of a person from a full spectrum of features of a person where sensor observable changes occur.

In some embodiments of the foregoing cyber determining process, the at least one provided cyber determination includes the determination of any indicated measure that exists of at least one yet-to-be-identified person being the same person as one specific known person, wherein the at least one determination ranges from determining the yet-to-be-identified person absolutely is not the known person, through determining any intermediate indicated measure of probability that exists of the yet-to-be-identified person being the known person, to determining the yet-to-be-identified person absolutely is the known person.

In some embodiments of the foregoing cyber determining process, the cyber determining process further comprises a repeating step in which the cyber determining process selects at least one part of at least one first series observation of at least one specific person for repetition by at least one yet-to-be-identified person, wherein the at least one yet-to-be-identified person performs the at least one repetition, wherein the cyber determining process assigns designations representing (a) the at least one observation, (b) the at least one repetition, and (c) at least one characteristic regarding the at least one yet-to-be-identified person.

In some embodiments of the foregoing cyber determining process, the scalable cyber determining process includes at least one second series observation record of the at least one repetition, and wherein the at least one second series observation record includes the designations assigned by the cyber determining process.

In some embodiments of the foregoing cyber determining process, the cyber determining process comprises searching available first series observation records of previously determined aspects of first series observation subjects until either every determination goal has been achieved, or there are no further comparable first series observation records to search.

In some embodiments of the foregoing cyber determining process, the cyber determining process further comprises utilizing information which is derived from at least one source other than at least one selected from the group of (a) the at least one first series observation record, and (b) the at least one second series observation record.

In some embodiments of the foregoing cyber determining process, the cyber determining process utilizes the at least one computing device, the selected criteria, the selected information, the selected programming, and any other necessary resource, all of which being utilized for the purpose of accurately granting or denying access to at least one part of at least one resource selected from the group consisting of (a) the cyber determining process (b) at least one cyber resource that is being utilized by the cyber determining process, and (c) at least one resource that is utilizing the cyber determining process.

In some embodiments of the foregoing cyber determining process, the cyber determining process further comprises manipulating, in any way possible, the operations of at least one selected from the group consisting of (a) the cyber determining process utilized resources, and (b) the cyber determining process itself; wherein the manipulating provides the cyber determining process with selection of possible utilizations, and wherein the manipulating is utilized for at least one purpose.

In some embodiments of the foregoing cyber determining process, the at least one purpose for utilizing the manipulating includes aiding in achieving at least one attainable cyber determination goal.

In some embodiments of the foregoing cyber determining process, the cyber determining process further includes cyber determining process history, wherein the cyber determining process history includes at least one cyber determining process history record.

In some embodiments of the foregoing cyber determining process, at least one observation record that was derived from at least one source other than the first series observation step is included as at least one first series observation record.

In some embodiments of the foregoing cyber determining process, at least one observation record that was derived from at least one source other than the second series observation step is included as at least one second series observation record.

In some embodiments of the foregoing cyber determining process, all or any part of the operations of the cyber determining process may be performed in any order.

In some embodiments of the foregoing cyber determining process, the cyber determining process includes at least one standard cyber determining process designation representing at least one aspect of at least one operation of the cyber determining process.

In another aspect, a scalable universal full spectrum cyber determining process is provided which comprises:

deriving information, from at least one point in time or over at least one period of time, from a spectrum of information that includes at least one observed characteristic of at least one subject of at least one sensor observation, thereby obtaining derived information, wherein the at least one sensor observation is a type of sensor observation selected from the group consisting of (a) visual sensor observations, (b) audible sensor observations, (c) thermal sensor observations, (d) olfactory sensor observations, (e) tactile sensor observations, and (e) any other type of sensor observations;

the cyber determining process providing at least one cyber determination through the utilization of (a) at least one computing device (b) criteria that may be utilized by the cyber determining process, (c) the derived information, and (d) any necessary programming and resources, wherein the cyber determining process provides at least one cyber determination selected from the group consisting of (i) at least one single cyber determination, (ii) at least one intermittently provided cyber determination, and (iii) at least one constantly provided cyber determination; and the at least one cyber determination being utilized for at least one purpose;

wherein the scalable cyber determining process further comprises utilizing at least one part of at least one step selected from the group consisting of (a) a first series observation step utilizing at least one sensor observation, wherein at least one subject of the at least one sensor observation has at least one previously determined aspect, the cyber determining process recognizing at least one characteristic regarding the previously determined aspect, the at least one recognized characteristic being utilizable by the cyber determining process in providing the at least one cyber determination, the cyber determining process assigning designations representing (i) the at least one observation, (ii) the at least one known aspect of the at least one observation subject, and (iii) the at least one observed characteristic, the cyber determining process including at least one of the designations in at least one first series observation record, (b) a second series observation step utilizing at least one sensor observation, wherein at least one subject of the at least one sensor observation has at least one yet-to-be-determined aspect, the scalable cyber determining process recognizing at least one characteristic regarding the at least one yet-to-be-determined aspect, the cyber determining process assigning designations representing (i) the at least one observation, (ii) the at least one yet-to-be-determined aspect of the at least one observation subject, and (iii) the at least one characteristic regarding the at least one yet-to-be-determined aspect, wherein the cyber determining process including at least one of the designations in at least one second series observation record, (c) a matching step matching at least one designation regarding at least one subject from at least one second series observation record with at least one comparable designation regarding at least one comparable subject from at least one first series observation record, (d) a comparing step comparing designations from at least one second series observation record with designations from at least one comparable first series observation record, and providing at least one conclusion from the comparison, (e) a determining step wherein the cyber determining process utilizes at least one from the group of (i) the at least one conclusion from the at least one comparing step, and (ii) the information, for making the at least one cyber determination, and (f) a reporting step providing at least one report regarding at least one aspect of at least one part of at least one cycle of utilization of the cyber determining process.

DETAILED DESCRIPTION

Figure 1:
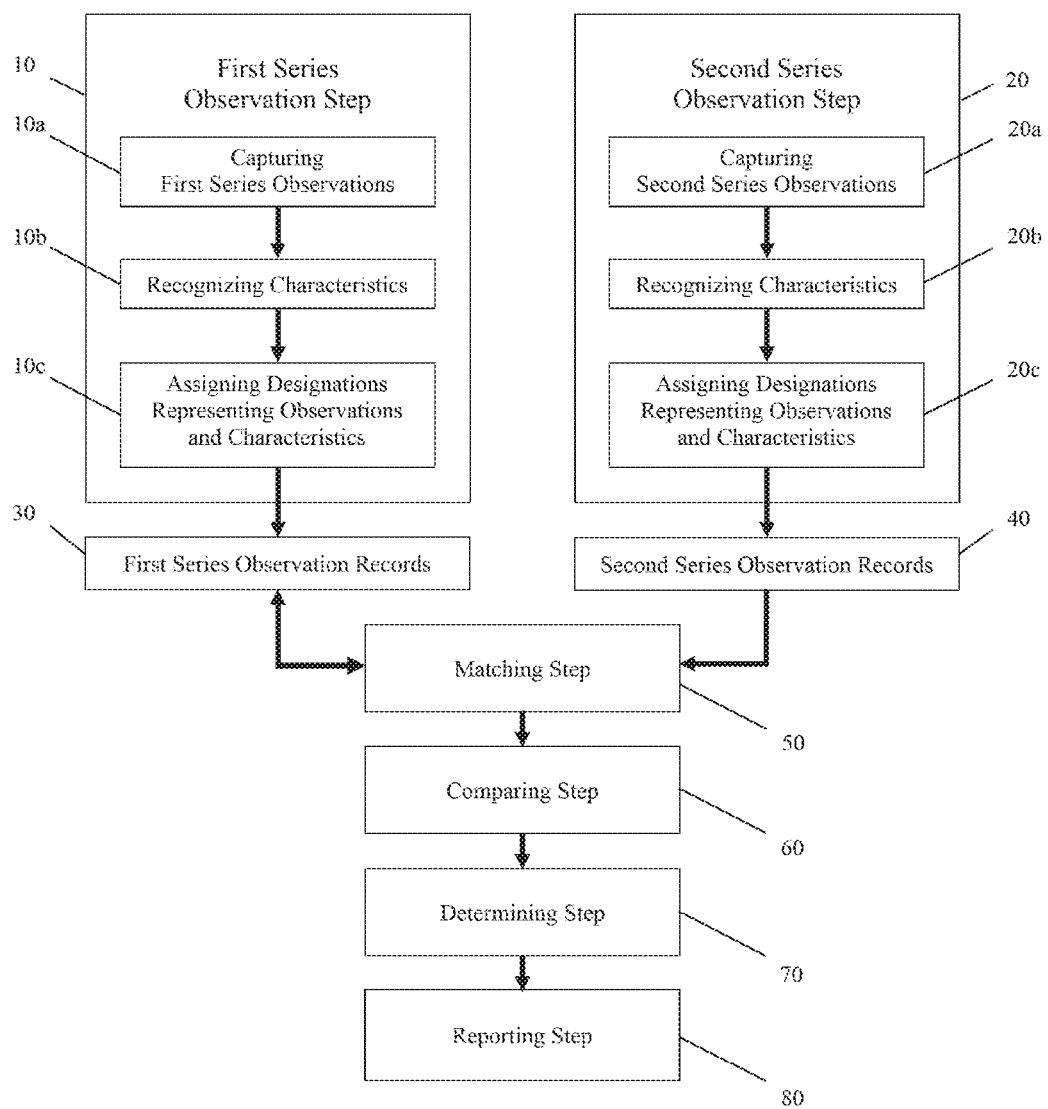
FIG. 1 is a flowchart which illustrates one particular, non-limiting embodiment of the operations of the cyber determining process disclosed herein.

At present, we live in a technologically interconnected world where the vast spectrum of available cyber resources is ever widening. Over time, our technologically interconnected world appears to be destined to provide every possible cyber resource that humanity could ever want or need. Included in those cyber resources, and in accordance with the teachings herein, will be a scalable universal full spectrum cyber determining process that may be capable of providing the presently needed 100% accurate cyber determinations of the identity of a person, and also any other cyber determinations our world could ever want or need. A further discussion of this universal concept is disclosed in now allowed patent application Ser. No. 15/236,337, filed Aug. 12, 2016, entitled "Point-of-Cyber-Access Cyber System", having the same inventor, which is incorporated herein by reference in its entirety; which application is a continuation-in-part application of U.S. patent application Ser. No. 14/447,283 filed on Jul. 30, 2014, issued as U.S. Pat. No. 9,479,507 on Oct. 25, 2016, entitled "Single-Point-of-Access Cyber System", having the same inventor, which is incorporated herein by reference in its entirety; which application is a continuation application of U.S. patent application Ser. No. 13/702,537 filed on Oct. 19, 2011, issued as U.S. Pat. No. 8,832,794 on Sep. 9, 2014, entitled "Single-Point-of-Access Cyber System", having the same inventor, which is incorporated herein by reference in its entirety.

In light of the foregoing, there is presently an unanswered need in the art for a cyber determining process that:

provides cyber determinations regarding a known person and a yet-to-be-identified person being the same person at any attainable level of accuracy, including 100% accuracy;

utilizes any number of observed characteristics of a known person or a yet-to-be-identified person for making cyber determinations of identity;

utilizes observations of a person who is not consciously engaged in a cyber determination of identity;

provides single cyber determinations of identity, intermittently provided cyber determinations of identity, and constantly provided cyber determinations of identity regarding a person or any other observation subject;

utilizes observations where a yet-to-be-identified person repeats a portion of a selected, previously captured sensor observation of a known person;

utilizes any available useful sensor observation for making cyber determinations;

utilizes any number of observed, characteristics of a known subject of an observation or a yet-to-be-identified subject of an observation for making cyber determinations;

provides and utilizes standard designations for accurately and consistently representing any aspect of the operations of the cyber determining process;

provides absolute security and privacy for any information and resources (a) that are utilized by the cyber determining process, and (b) that are utilizing the cyber determining process;

utilizes any useful criteria for observing, recognizing, matching, comparing, determining, reporting, or, any other aspect of providing cyber determinations;

utilizes observations made other than by the cyber determining process for providing cyber determinations;

utilizes useful information of any type from any source for providing cyber determinations;

utilizes at least one recognized characteristic for providing cyber determinations;

utilizes comparisons of at least one matching characteristic to achieve a predetermined attainable cyber determination goal; and is scalable in regard to included resources, to fall at any one point in the range of from a minimum to a maximum, wherein at the minimum the cyber determining process includes only the resources that are needed for providing for the least complex (with respect to included necessary resources) of all cyber determination needs, and wherein at the maximum the cyber determining process includes all of the resource that are needed for providing every cyber determination from the full spectrum of cyber determinations.

A technologically interconnected world that is capable of providing every possible cyber resource humanity could ever want or need can only be built upon the foundation of a secure and safe cyber environment. Utilization of accurate and reliable cyber determinations regarding the identity of any one specific person is an indispensable step in providing a secure and safe cyber environment and ecosystem.

Therefore, there is a need in the art for a scalable universal full spectrum cyber determining process that provides 100% accurate cyber determinations regarding the identity of a person.

The foregoing needs, and other needs, may be met with the process, systems and methodologies disclosed herein.

Definitions

The following terms, as used in the present disclosure, have the meanings indicated.

Absolutely Unique: occurring at a ratio of one to the total (non-zero) number of first series observation files.

Biological characteristic: any characteristic of a biological organism, including a person, that can be observed and reported upon.

Unique biological characteristic: any single observable characteristic of a biological organism, or any combination of observable characteristics of one biological organism (e.g., a biological fingerprint), that can be considered to be unique, or absolutely unique, to the observed biological organism.

Capture/capturing: the use of cyber resources for acquiring and recording cyber sensor observations.

Characteristic: a recognized aspect regarding another aspect of an observation that can be assigned at least one designation for further utilization.

Characteristics: at least one characteristic.

Constant/constantly: occurring at any selected frequency that provides for essentially continuous determinations.

Criteria: a group of options containing at least one member.

Cyber: utilizing non-biological processing of programming. Anything such as devices, programming, processes, or files that utilize non-biological processing of programming in any way.

Cyber Portal/Cyber portal: an input output device that is a component of a Single-Point-of-Access Cyber System or a Point-of-Cyber-Access Cyber System.

Designation/designations: one or more informational representations regarding one of more sensor observations or one or more sensor observation subjects.

Determination of identity: (a) determination of previously unknown identity, or (b) authentication of claimed identity.

Full spectrum: the complete set of possible choices for a given variable or option, which includes the subset of available choices for any given variable or option. Thus, for example, the full spectrum of cyber resources is the complete set of possible cyber resources, which includes all available cyber resources.

Identity determinations: at least one determination of identity.

Known person: a person who is at least one known subject of at least one first series observation record.

Or: unless otherwise specified herein, the term "or" shall be construed as the logically inclusive "or". Hence, the statement "A or B" shall be true if only A is true, if only B is true, or if both A and B are true. The notation "A and/or B" explicitly refers to the logically inclusive "or".

Recognized: any aspect of an observation or a subject of an observation that is identified for further utilization.

Selected from: "from" or "selected from". One skilled in the art will appreciate that the expression "x is selected from the group G", where x is a group member variable and G is the group, is legal terminology (Markush language) which is merely intended to specify possible values for x, and which does not by itself suggest or imply an actual selection step in any methodology or system this terminology is being used to describe.

Series: a group of at least one.

Unique: occurring at a selected ratio other than the ratio of absolutely unique.

Yet-to-be-identified person: at least one specific person who is a subject of a second series observation; a specific person who has not been determined, utilizing predetermined criteria, to be the same person as a known person.

Overview

The following brief overview pertains to the scalable universal full spectrum cyber determining process in general which is disclosed herein. However, it also pertains, in part, to the more specific utilization of the cyber determining process for providing accurate and reliable cyber determinations regarding the identity of a person.

In accordance with the teachings herein, a scalable universal full spectrum cyber determining process is disclosed that may accurately and reliably provide one or more cyber determinations from a full spectrum of cyber determinations. The systems and methodologies disclosed herein for providing accurate cyber determinations regarding the identity of a person provide the foundation upon which a secure, safe, and private technologically interconnected world may be built.

Additionally, through utilization of the accurate and reliable cyber determinations regarding the identity of a person that are provided by the cyber determining process disclosed herein, cyber environments may soon change from environments of unparalleled chaos, to a unified and orderly technologically interconnected environment that provides all users with reasonable levels of cybersecurity, cyber safety, and cyber privacy.

The following list includes a portion of the resources and features from the full spectrum of resources and features that may be provided by the scalable universal full spectrum cyber determining process disclosed herein:

a. cyber determinations regarding some or all subjects from the full spectrum of subjects of cyber determinations;

b. cyber determinations regarding some or all aspects from the full spectrum of aspects of subjects of cyber determinations;

c. cyber determinations that may fill some or all needs from the full spectrum of needs for cyber determinations;

d. cyber determinations that may be provided at one or more attainable levels of accuracy including 100% accuracy;

e. cyber determinations that may utilize some or all resources from the full spectrum of available useful resources;

f. cyber determinations that may utilize some or all information from the full spectrum of available useful information;

g. cyber determinations that may utilize some or all observations from the full spectrum of available useful observations;

h. cyber determinations that may utilize some or all observable characteristics of a subject of an observation from the full spectrum of observable characteristics of subjects of observations;

i. cyber determinations that may utilize some or all criteria from the full spectrum of useful criteria;

j. cyber determinations that may utilize standard designations for accurately and reliably representing any aspect of the operations of the cyber determining process;

j. cyber determinations that may be (i) provided one single time, or (ii) provided intermittently, or (iii) provided constantly;

l. utilization of the cyber determining process for the purpose of accurately granting and denying access to any from the list of (i) the cyber determining process itself, (ii) cyber resources that are being utilized by the cyber determining process, and (iii) cyber resources that are utilizing the cyber determining process;

m. security and privacy, which may include absolute security and privacy, for some or all cyber resources or activities;

n. sensor observations of a person, where the person as a subject of the observation may be at any one point in a range of, from being present but not being consciously engaged in an observation, to being consciously engaged and participating in an observation;

o. scalability in regard to included necessary resources, wherein a cyber determining process may be specifically configured to include only the resources that are necessary to provide for cyber determination needs at any one point in a range from providing for the smallest of all cyber determination needs in regard to included necessary resources, to providing for the largest of all cyber determination needs in regard to included necessary resources;

p. ease of use in all phases of operations;

q. persistence in attempting to achieve selected cyber determination goals;

r. utilization of one or more observed behavioral or biological characteristics of a person for providing cyber determinations regarding the identity of the person;

s. alteration of operations of the cyber determining process itself or any resources being utilized by the cyber determining process for any purpose, including the purpose of aiding in attaining at least one cyber determination goal;

t. utilization of useful information that was derived from any source;

u. utilization of a unique combination of simultaneously occurring observed characteristics for the purpose of providing cyber determinations regarding a person or any other subject of an observation; and v. utilization of a combination of observed characteristics that occur over any period of time for the purpose of providing cyber determinations regarding a person or any other subject of an observation.

Proper utilization of cyber determinations regarding the identity of a person as disclosed herein (determinations of identity that may be highly accurate, including being 100% accurate) may, for the first time ever, enable the world to enjoy the benefits of a secure, safe, and private technologically interconnected cyber environment and ecosystem. Among the many benefits that may be derived from the utilization of the cyber determining process disclosed herein is its ability to determine and report on any indicated measure of probability that exists of a yet-to-be-identified person being the same person as one specific known person. At one end of the full spectrum of these cyber determinations of identity is the determination that a yet-to-be-identified person absolutely is the same person as a specific known person, and at the other end of the spectrum is the determination that a yet-to-be-identified person absolutely is not the same person as a specific known person.

Through the utilization of cyber resources and predetermined criteria, a preferred embodiment of the cyber determining process disclosed herein provides cyber determinations by comparing a yet-to-be-identified subject of an observation with a known subject of an observation. The cyber determining process utilizes predetermined criteria for every aspect of the operations of the cyber determining process where criteria are used. The cyber determining process may also provide or utilize standard designations to represent observations, characteristics and other aspects of the operations of the cyber determining process.

The scalable universal full spectrum cyber determining process, (a) may be configured as a single self-contained process, (b) may be configured to include utilization of more than one interconnected resource, (c) may be utilized as an integral or remote resource of a device or system, (d) may utilize all or any part of the resources of at least one device or system, (e) may be utilized in a virtual or physical environment or any combination thereof, (f) may be utilized by a stationary or a mobile device or a combination thereof, (g) may be utilized by one or more devices that are located in one or more locations, and (h) may utilize resources that may be interconnected in any way.

FIG. 1 depicts a first particular, non-limiting embodiment of the operations of the scalable universal full spectrum cyber determining process in accordance with the teachings herein for providing cyber determinations from the full spectrum of cyber determinations. The operations of the cyber determining process depicted herein, which uses suitable cyber resources and predetermined criteria, may commence by utilizing all or any part of a first series observation step 10 performed on a known subject of an observation. The first series observations step 10 includes capturing at least one first series observation 10a of the known first series observation subject, recognizing characteristics 10b from the captured observation, and then assigning designations 10c representing the observation and the characteristics from the observation. These designations may then be included as a part of the first series observation records 30 that represents the known subject.

The cyber determining process may further include utilization of all or any part of a second series observation step 20 performed on at least one subject of a second series observation that has at least one yet-to-be-determined aspect. The second series observation step 20 includes capturing at least one second series observation 20a of the at least one subject with the at least one yet-to-be-determined aspect, recognizing characteristics 20b from the captured observation regarding the yet-to-be-determined aspect, and then assigning designations 20c representing the observation and the characteristics from the observation. These designations may then be included in the second series observation records 40, which represent the at least one observation subject with the at least one yet-to-be-determined aspect.

The cyber determining process may interact with utilized cyber resources to control the operations of those resources for any purpose, including (a) the purpose of capturing any possible observations, and (b) the purpose of providing any useful variation of the operation of cyber resources.

Any step of the operations of the cyber determining process, or any portion thereof, may be performed in any order or sequence.

Operating in any usable order or sequence, and utilizing all or any part of at least one of the following steps, the cyber determining process may:

a. utilize useful observations or useful information from any source;

b. determine and utilize the level of determination accuracy that has been achieved;

c. determine and utilize a measure of adequacy of available resources;

d. utilize cyber resources to capture first series observations or second series observations;

e. recognize useful characteristics from observations;

f. utilize recognized characteristics from observations;

g. utilize at least one unique characteristic for providing cyber determinations;

h. assign designations to recognized characteristics;

i. determine which, and the order in which, recognized characteristics will be utilized for comparing or determining;

j. match observations and recognized characteristics from second series observation records, during a matching step 50, with corresponding comparable observations and recognized characteristics from first series observation records;

k. determine and provide conclusions as to the indicated measure of comparison between characteristics from the second series observation records and characteristics from the first series observation records during a comparing step 60;

l. select which conclusions from comparing will be utilized for determining;

m. utilize (a) conclusions from comparing, or (b) information, for providing cyber determinations;

n. provide cyber determinations that may include cyber determinations of the identity of a person regarding any indicated measure of probability that exists of a known person and a yet-to-be-identified person being the same person during a determining step 70; and o. report on any aspect of the operations of the cyber determining process during a reporting step 80.

Additionally, based upon predetermined criteria, the cyber determining process may be persistent in attempting to attain a cyber determination goal. As an example, should a determination based upon conclusions from comparing a first characteristic of a person not result in the cyber determining process achieving a selected cyber determination of identity goal, then the cyber determining process may continue the comparing and determining until the selected cyber determination of identity goal is achieved or there are no further first and second series observation records to compare.

Should a determination of identity based upon conclusions from comparing all available useful characteristics of the yet-to-be-identified person not result in determining a selected determination of identity goal, then the cyber determining process may utilize at least one additional observation of the yet-to-be-identified person to add to the second series observation records of the yet-to-be-identified person.

The cyber determining process may select a portion of a first series observation record of a specific known person to be repeated by the yet-to-be-identified person for inclusion in the yet-to-be-identified person's second series observation records.

In order for the cyber determining process to capture observations that are most likely to aid in achieving selected cyber determination goals, the cyber determining process may alter any operational aspect that may be altered of any cyber resource that the determining process is utilizing for capturing observations.

DESCRIPTION

The scalable universal full spectrum cyber determining process disclosed herein may be utilized to merge the present with the future, which may be further appreciated after reading the following vision of a technologically interconnected future.

We live in a technologically interconnected world where vast cyber resources presently exist. Within this technologically interconnected world, we utilize cyber resources from a full spectrum of available cyber resources. This full spectrum of available cyber resources is ever widening, and over time, our technologically interconnected world appears to be destined to provide every possible cyber resource that humanity could ever want or need. When that time comes, the entire body of cyber resources will include—and will rely heavily upon—a scalable universal full spectrum cyber determining process (such as the scalable universal full spectrum cyber determining process of the present disclosure) that may provide not only essentially 100% accurate determinations regarding the identity of a person, but also every other cyber determination our world could ever want or need.

To more fully understand the implications of the utilization of the cyber determining process of the present disclosure, it is helpful to see its relationship to (a) U.S. Ser. No. 15/236,337 (Aronson), entitled "Point-of-Cyber-Access Cyber System", filed Aug. 12, 2016 (now allowed); (b) U.S. Pat. No. 9,479,507 (Aronson), entitled "Single-Point-of-Access Cyber System", issued on Oct. 25, 2016; and (c) U.S. Pat. No. 8,832,794 (Aronson), entitled "Single-Point-of-Access Cyber System", issued on Sep. 9, 2014.

The core operations of a preferred embodiment of the cyber determining process may best be understood through a particular, detailed and non-limiting example of the utilization of this cyber determining process for the purpose of providing a single selected determination of identity that a specific, yet-to-be-identified person and a specific known person absolutely are the same person. One of many predetermined criteria utilized for performing this cycle of the utilization of the cyber determining process is that the full resources that are available to the cyber determining process should be utilized in any way possible to persistently work towards accomplishing the selected cyber determination of identity goal.

In one scenario, a "known person" owns a portable computer. The cyber determining process is configured to be utilized as an integral resource of the known person's portable computer. The cyber determining process is utilized, in part, for providing determinations of identity that may then be utilized to exclusively grant only the known person access to further use of his or her portable computer's resources. The portable computer may utilize, for any purpose, the known person's personally configured and built cyber determining process. In addition, the portable computer includes a microphone and a camera, with adjustable operations, that the cyber determining process may utilize and also control.

The cyber determining process utilizes observations of the known person that come from what may be a vast collection of observations that make up the known person's first series observation records. The first series observation records of the known person are exclusively made up of observations that include the known person as a subject of the observation. The known person's first series observation records are comprised of the designations that comprise the cyber identity of the known person.

A cycle of the utilization of the cyber determining process is initiated by a yet-to-be-identified person requesting use of the known person's portable computer.

Every aspect of the operation of the cyber determining process utilizes predetermined criteria. Criteria from a full spectrum of criteria may be predetermined by the known person, or criteria may be predetermined as an integral part of the operations of the cyber resources that were selected for use, or criteria may be predetermined as a part of the operations of the cyber determining process, or criteria may be predetermined utilizing any other means for selecting criteria, or any combination thereof. Selection of anything may also constitute selecting criteria.

Criteria are selected choices of who, when, where, what, why, or how as each relates to any aspect of the operations of the cyber determining process. Providing a choice of any possible criteria, and any criteria being possible, may well be the most important feature that many cyber resources have to offer. The cyber determining process disclosed herein may take full and best advantage of this particular cyber feature by providing any user with a choice of selection of available criteria regarding any aspects of his or her utilization of the cyber determining process.

In the instance of this cycle of the utilization of the cyber determining process, the cyber determining process, utilizing predetermined criteria, utilizes the computer's camera to capture an image of the yet-to-be-identified person. The cyber determining process, again using predetermined criteria, utilizes the zoom feature of the camera to closely frame an image of only the face of the yet-to-be-identified person in order to provide an observation that would most likely aid in achieving the selected cyber determination of identity goal.

As a part of either series of observations, utilizing cyber resources and predetermined criteria, the cyber determining process recognizes useful characteristics of any kind from the observations.

The cyber determining process may provide and utilize a standard set of designations for accurately and reliably representing any aspect of the cyber determining process and its operations.

Utilization of one, and only one, standard set of designations is an important aspect of accurately, reliably and consistently providing cyber determinations, while utilizing any available observation or cyber resources from any place on the planet. This approach also preferably implements a strategy of providing, on a worldwide basis, extremely consistent and accurate assignments of standard designations to every recognized aspect of each and every observation and observed characteristic.

Designations that accurately and reliably represent the observation and observed characteristics, including designations representing the captured image of the yet-to-be-identified person's face, are assigned and then included in second series observation records for utilization in this cycle of the operation of the cyber determining process. In addition, standard designations may be accurately and consistently assigned, according to cyber determining process standards, so that designations representing observations and recognized characteristics from either series of observations may be universally utilized across the entire technologically interconnected cyber environment where the cyber determining process is utilized.

The cyber determining process utilizes predetermined criteria for matching the yet-to-be-identified person's observations and characteristics from second series observation records with at least one comparable first series observation record of one known person.

In the instance of this cycle of the utilization of the cyber determining process, predetermined criteria preferably call for selecting and then utilizing at least one comparable observation record from the first series observation records of the known person. Further, the at least one selected observation record may be the most likely of all available observation records to aid in accurately achieving the selected cyber determination of identity goal.

Through the incredible speed and power of the operations of cyber resources, any large number of criteria may collectively or selectively be utilized for any aspect of the operations of the cyber determining process.

In the instance of this cycle of the utilization of the cyber determining process, predetermined criteria may utilize parameters such as time, date, temperature, light sources, light levels, the portion of the yet-to-be-identified person that was observed, and the clarity of observation for matching the second series observation records of the yet-to-be-identified person with at least one comparable first series observation record of a known person.

The cyber determining process provides final determinations for many aspects of each observation at the time when designations are assigned to recognized characteristics. For example, a final determination may be provided that a person who was a subject of a sensor observation had red hair, or hazel eyes, or a particular geometry and ratio of movement between joints in a finger while opening or closing, or any other behavioral or biological characteristic.

Further, when utilizing an observation that has more than one person as a subject of the observation, the cyber determining process may exclude from further determinations any person who is a subject of the observation who has been determined to not fit certain criteria. For example, in keeping with the previous example, the cyber determining process may exclude from further determinations any person who has been determined to have hair that is not red or eyes that are not hazel. Also, based upon predetermined criteria, a yet-to-be-identified person may be determined to absolutely not be the same person as the specific known person if it was determined that the yet-to-be-identified person did not have red hair or hazel eyes.

Utilizing cyber resources and predetermined criteria, matched observation records of the yet-to-be-identified person and the known person are compared by the cyber determining process. Any predetermined criteria may be utilized by the cyber determining process for any aspect of comparing observations.

Utilizing cyber resources and predetermined criteria, conclusions from comparing observation records, along with any useful information, may be utilized by the cyber determining process for providing cyber determinations. Any predetermined criteria may be utilized by the cyber determining process for any aspect of providing cyber determinations.

As a specific example, suppose that in the instance of this cycle of utilization of the cyber determining process, a yet-to-be-identified person is wearing large dark glasses that prevent the cyber determining process from utilizing any comparison from the entire area of his or her eyes. Suppose further that the yet-to-be-identified person is wearing a hat that covers the area where the known person has a small scar crossing a pea-sized birthmark. As a result, this very unique biological characteristics of the known person cannot be utilized for making cyber determinations of identity.

In such a case, the conclusion from comparing a first set of matched characteristics may not provide a cyber determination that met the cyber determination of identity goal of this cycle of the utilization of the cyber determining process. Hence, following predetermined criteria, the cyber determining process may be configured to continue to utilize conclusions from the comparison of characteristics until the goal of this cycle of the utilization of the cyber determining process is attained, or until there are no further conclusions from the comparing step to utilize.

In the present example, the goal of this cycle of the utilization of the cyber determining process has not been attained. Hence, the cyber determining process selects utilization of a further observation of the yet-to-be-identified person's left hand. In this example, the cyber determining process requests that the yet-to-be-identified person fully open his or her left hand in the presence of the computer's camera, with the fingernails facing the camera, and that the properly positioned hand be closed and opened again fully.

The yet-to-be-identified person, still wanting to gain access to the resources of the known person's computer, complies with the request from the cyber determining process which was presented to the yet-to-be-identified person on the computer's image display screen. The cyber determining process operates the zoom on the computer's camera to provide the optimum captured observation for this cycle of the utilization of the cyber determining process.

In this instance, the cyber determining process utilizes comparisons of designations regarding geometry of movement, and also the visual presence of the moving hand and fingers, for providing this cyber determination of identity.

The selected second series observation record provides an overabundance of behavioral and biological characteristics that may be utilized for providing the cyber determination of identity, far more than are needed for determining, with essentially 100% accuracy, that the yet-to-be-identified person and the known person absolutely are the same person. In the present example, just a portion of the characteristics that were recognized from the opening and closing of a single finger may have been used to achieve the selected cyber determination goal for this cycle of the utilization of the cyber determining process.

Once the selected determination has been attained, the cyber determining process may report the determination, utilizing cyber resources and any predetermined criteria for any aspect of reporting.

In the instance of this cycle of the utilization of the cyber determining process, the determination of identity is reported to a history that the cyber determining process maintains, and also to programming running on the portable computer of the known person whereby, having received the report from the cyber determining process that the yet-to-be-identified person absolutely is the known person, the computer then grants the known person exclusive access to use of the resources of his or her own computer. History, or any other aspect of the operations of the cyber determining process, may be stored in volatile or non-volatile memory, e.g., in one or more storage modules that are utilized by one or more computers.

Figure 2:
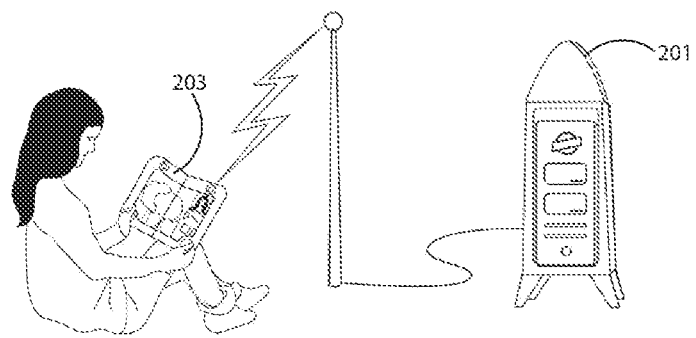
FIG. 2 is an overview diagram of a person utilizing a cyber portal for gaining access to her remotely located point of cyber access computer. The cyber determining process is an integral resource of the point of cyber access computer, and the cyber determining process is utilized for providing determinations of identity of a person as a prerequisite for gaining access. The point of cyber access computer and the cyber portal are components of the "Single-Point-of-Access Cyber System" described in U.S. Pat. No. 9,479,507 (Aronson) and the "Point-of-Cyber-Access Cyber System" described in U.S. 2016/0352740 (Aronson). This diagram illustrates one particular, non-limiting embodiment of the cyber determining process disclosed herein.

FIG. 2 depicts a particular, non-limiting embodiment of a person utilizing a cyber portal for gaining access to her remotely located point of cyber access computer. The cyber determining process is utilized as an integral resource of this point of cyber access computer, and the cyber determining process is utilized for providing determinations of identity of a person as a prerequisite for granting access to the person. The point of cyber access computer and the cyber portal are components of the "Single-Point-of-Access Cyber System" and the "Point-of-Cyber-Access Cyber System"

Figure 3:
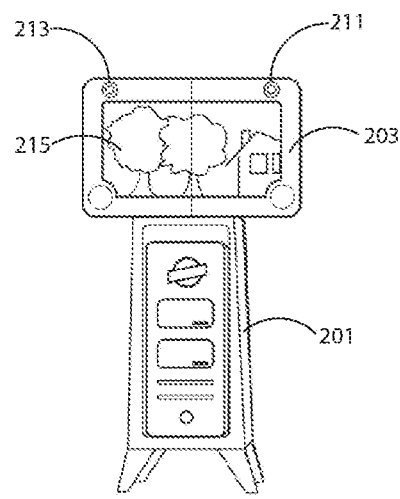
FIG. 3 is an overview diagram of a point of cyber access computer that comprises an integral cyber portal and also a cyber determining process that is personally configured for the proprietary user of the point of cyber access computer. This diagram illustrates one particular, non-limiting embodiment of the cyber determining process disclosed herein.

FIG. 3 depicts a particular, non-limiting embodiment of a point of cyber access computer with an integral cyber portal.

In order to best demonstrate a few selected further utilizations of the systems and methodologies disclosed herein, it is helpful to consider the future, which may be illustrated with reference to the Single-Point-of-Access Cyber System. This is advantageous in that the Single-Point-of-Access Cyber System is a technologically interconnected environment and cyber ecosystem that may provide for the fullest and best utilization of a scalable universal full spectrum cyber determining process.

To begin with, the Single-Point-of-Access Cyber System architecture provides each person with one remotely accessible point of cyber access computer 201. Each person may utilize any mobile or stationary remote terminal-type of device that is called a cyber portal 203 to gain secure and private access to his or her own remotely located point of cyber access computer 201.

Each person's own remotely located point of cyber access computer may utilize the cyber determining process disclosed herein for providing cyber determinations of identity with a high degree of accuracy, up to and including 100% accuracy. In this example, when 100% accuracy has been achieved, the yet-to-be-identified person will be determined to be absolutely the same person as the proprietary user of the point of cyber access computer, which must occur before the previously yet-to-be-identified person is granted access to the personal and private resources of his or her own personal remotely located point of cyber access computer.

Enabled by the cyber determination of identity resources of the disclosed cyber determining process, the Single-Point-of-Access Cyber System may be utilized to provide a technologically interconnected world with an environment and cyber ecosystem that provides for the highest attainable levels of cyber security, cyber safety, and cyber privacy.

A cycle of utilization of the cyber determining process is initiated by a yet-to-be-identified person who utilizes any cyber portal 203 to call up his or her own personal, remotely located point of cyber access computer 201, and then request access to the personal and private resources of his or her own point of cyber access computer.

Each person's point of cyber access computer is configured to where only one specific person, the point of cyber access computer's proprietary user, may gain access to its personal and private resources, and only after that person has, with up to 100% accuracy, been determined to be the proprietary user of the point of cyber access computer. In this instance, the cyber determining process is utilized by the point of cyber access computer. The cyber determining process component of the point of cyber access computer requests, through use of the cyber portal's image display screen 215, that the yet-to-be-identified person requesting access repeat a phrase the cyber determining process has randomly selected from the first series observation records of the proprietary user of the point of cyber access computer.

The cyber determining process may utilize any criteria for selecting the phrase to be repeated. For example, in the instance of this cycle of the utilization of the cyber determining process, the phrase to be repeated may be selected based upon camera observations from the utilized cyber portal in regard to light levels, light source, pose, camera angle, movement of the yet-to-be-identified person, movement of the cyber portal, and a number of other cyber determining process selected criteria.

The yet-to-be-identified person repeats the cyber determining process selected phrase for the microphone 213 and camera 211 of the cyber portal 203. The cyber determining process, utilizing predetermined criteria and available cyber resources, controls the operations of the microphone 213 and the pan, tilt, and zoom modes of the camera 211 of the cyber portal in order to capture the optimum second series observation of the yet-to-be-identified person.

The cyber determining process recognizes characteristics from this observation and accurately assigns standard designations to recognized characteristics. The designations representing the observation and recognized characteristics are included in the yet-to-be-identified person's second series observation records.

The designations representing the repeating of the selected phrase are then compared, utilizing the predetermined criteria of first matching the peak and valley graph representations of the sound of the voice from the repeating with the peak and valley graph representations of the voice from the proprietary user of the point of cyber access computer originally speaking the phrase that was repeated. Then, if a match exists, the cyber determining process further compares the position of the mouth at various landmarks such as, for example, high peaks in the peak and valley graph.

In this instance, the cyber determining process determines that the yet-to-be-identified person requesting access absolutely is the proprietary user of the point of cyber access computer and the proprietary user is thereby granted exclusive access to the personal and private resources of his or her own personal remotely located point of cyber access computer 201.

It is best to utilize, environment-wide, a set of determination of identity criteria that provide a person with secure, safe, and private access to his or her own remote or local computer or cyber resources. To achieve this secure, safe and private cyber environment and cyber ecosystem, it is desirable to utilize criteria that require an essentially 100% accurate determination of identity be made of a person before granting that person access to his or her own computer or cyber resources. It is further recommended that criteria be utilized that require constant determinations of identity to be made of the same person while that person is utilizing, in any way, his or her own computer or cyber resources.

In light of the foregoing, the Single-Point-of-Access Cyber System not only requires that a person be accurately determined to be the proprietary user of his or her point of cyber access computer before the person may gain access to its personal and private resources, but the Single-Point-of-Access Cyber System also preferably requires the person utilizing his or her point of cyber access computer be constantly determined to be its proprietary user while that person is using, in any way, his or her own personal point of cyber access computer.

One example of how the cyber determining process may provide constant identity determinations utilizes sequential video images of the face of the user of the cyber portal. Predetermined criteria call for a comparison of the most current sequential image of the face with the immediate prior image of the eyes at a frequency that would not allow the observed user to be changed. This method provides a weak, but accurate, constant determination of identity. Additionally, for this cycle of utilization of the cyber determining process, predetermined criteria preferably call for an essentially 100% accurate determination of identity to be made each time the person who is using the cyber portal blinks his or her eyes.

Point of cyber access computers may be primarily voice operated, thereby providing the cyber determining process with a vast collection of first series observation records of the proprietary user of the point of cyber access computer when he or she is speaking. In addition, should a person be wearing dark glasses that prevent the use of the person's eyes for making determinations of identity, then the cyber determining process may utilize observations of the person's mouth for providing determinations of identity. The cyber determining process may also utilize analysis of observations of the unique characteristics of the mouth that had been captured at a frequency that would provide essentially constant determination as to whether or not the same mouth was the subject of the observation. Moreover, an essentially 100% accurate identity determination may be provided when this person speaks, wherein the cyber determining process compares a portion of what was said by the yet-to-be-identified person with a comparable observation of the proprietary user of the point of cyber access computer speaking the same words.

In the event that it is not possible to utilize either of the prior strategies for providing constant determinations of identity of the user of a cyber portal, then the cyber determining process may utilize any possible aspect of a sensor observation of the user of the cyber portal to persistently attempt to attain an essentially 100% accurate determination that the person who is using the cyber portal is the proprietary user of the point of cyber access computer.

A point of cyber access computer from the Single-Point-of-Access Cyber System or the Point-of-Cyber-Access Cyber System is preferably a remotely accessible computer that securely and privately provides almost every cyber resource the proprietary user of the point of cyber access computer could ever want or need.

As a specific example of the use of the systems disclosed herein, at the point in the future when it is possible to utilize almost every cyber resource humanity could ever want or need, a person may utilize his or her own remotely located point of cyber access computer to navigate through the maze of a large open market area of an ancient and irregular part of a city in a country in which that person has never before been. The point of cyber access computer will utilize the disclosed cyber determining process to aid the proprietary user of the point of cyber access computer in navigating the maze.

The point of cyber access computer may utilize a cyber determining process and cyber positioning resources to determine the general geographic location of its proprietary user. The cyber determining process may then utilize visual observations that are provided by available public cameras to first find its proprietary user from the large group of people at the market, then accurately confirm that the found person was the proprietary user of the computer, and then, to the extent possible, the cyber determining process, using available cyber resources, may provide constant identity and location determinations regarding its proprietary user as he or she moves through the market. The cyber determining process, having been provided with real-time information about the location of the person, will in turn be utilized by the person's point of access computer for providing the person with the best possible aid in navigating through the maze of the busy congested market.

Another feature of a preferred embodiment of the scalable universal full spectrum cyber determining process is its ability to provide cyber determinations not only of a person, but also of any other recognizable biological observation, any recognizable non-biological observation, and any recognizable environment observation.

At times, utilizing criteria that require providing constant observation, no part of the person may be observable. However, there may be visible parts of anything that has previously been on or about the body of the person that may be utilized by the cyber determining process for visually following the otherwise unidentifiable person as he or she walks through the market.

As a further illustration of the possible uses of the systems disclosed herein, at a time when there is a cyber environment that provides every resource a person could want or need, cyber resources may be utilized to observe a rock wall and, through utilization of the disclosed cyber determining process, the cyber resources may provide accurate information about the location of the wall, when the wall was built, what type of materials were used, and from where the rocks originally came.

The scalable universal full spectrum cyber determining process-enabled, secure, safe, and private technologically interconnected environment and cyber ecosystem of the Single-Point-of-Access Cyber System or the Point-of-Cyber-Access Cyber System may be utilized to provide the planet with vast new cyber resources. Among those resources will preferably be devices that utilize sensors to regularly monitor at least one selected aspect of a person's health.

The preferably voice operated point of cyber access computer may be fully utilized through use of an cyber portal that is similar in size and worn similarly to a wristwatch. Although a cyber portal with an image display screen of such a small size may require intermittent use of a larger image display screen, a wristwatch-configured cyber portal may nonetheless provide the greatest all-around utility of any cyber portal configuration, in part because a wristwatch-configured cyber portal that includes one or more health sensors may be utilized in conjunction with the disclosed cyber determining process to securely and privately monitor and report to one's point of cyber access computer any possible health observations (both internally and externally).

A person's own personal point of cyber access computer may then utilize those cyber determining process health observations for providing the person (perhaps through use of his or her wristwatch-configured cyber portal) reports of any health information that the person may want or need to be made aware of.

Through utilization of the security, safety and privacy that is enabled by use of determinations of identity of a person that are provided by the disclosed cyber determining process and the resources of the Single-Point-of-Access Cyber System or the Point-of-Cyber-Access Cyber System, it may be possible to securely and privately provide all, or any part, of a person's own personal and private health information to health care providers of choice so that those health care providers may have the ability to better provide the person with the best of all possible health care outcomes.

Additionally, it may be possible for a person to anonymously provide all, or any part, of his or her health information to selected others for health-related research.

Utilizing a wristwatch-configured cyber portal/health monitoring device that is working in conjunction with the disclosed cyber determining process, each person may enjoy the benefits of secure and private uninterrupted observations of any number of measures of his or her health. Moreover, using the same wristwatch-configured cyber portal/health monitoring device, a person may also enjoy the benefits of utilization of any of the resources of the person's own remotely located cyber determining process and point of cyber access computer.

Looking to the present again, and more particularly cybersecurity's present need for an easy to use, versatile cyber determining process that provides essentially 100% accurate cyber determinations of a specific person's identity, it is clear that prior art cybersecurity cyber identity measures fail to meet present needs for cyber determinations of identity. This is so because prior art cyber determinations of identity measures do not go so far as to identify each person by means of utilizing unique behavioral and biological characteristics of the person that cannot be replicated by any others. The cyber determining process of the present disclosure preferably provides determinations of identity of any person by utilizing unique behavioral and biological characteristics of the person. These characteristics are preferably of a type that cannot be replicated by any other person or device.

The scalable universal full spectrum cyber determining process, as utilized for providing essentially 100% accurate cyber determinations of the identity of a person, preferably utilizes as many unique biological or behavioral characteristics of a person as are necessary to achieve an attainable selected determination of identity goal. Many examples of characteristics of a person have previously been addressed. However, when internal and external sensor observations (which may include physiological or biological sensor observations) of a person are utilized, there are a very large number of possible unique combinations of characteristics that may be utilized for providing determinations of identity of just one person. With every unique behavioral or biological characteristic of a person that has been sensor observed also exists a means for accurately providing cyber determinations of identity by comparing second series observation records of a yet-to-be-identified person to the first series observation records of a specific known person.

The cyber determining process disclosed herein may provide any cyber determination from a full spectrum of cyber determinations regarding sensor observation of not only a person, but also any other biological, non-biological, or environment observations.

Within the full spectrum of determinations of identity regarding a person are a multitude of determinations that fall short of providing a determination that a yet-to-be-identified person and a specific known person absolutely are the same person. For example, there are determinations of hair color, moles, wrinkles in skin, freckles, geometry of motion at joints, scars, height, eye color, and so forth.

There are also identity determinations of any measure of probability that exists of a specific known person and a yet-to-be-identified person being the same person. This type of determination is useful in many ways: for example, it may be utilized to provide an indicated measure of probability that has been accomplished, at a specific point in an operational cycle of use of the process, for providing a selected determination of identity. Moreover, should there be more than one person as the subject of a second series observation, all those who are not the same person as the known person may be eliminated by utilizing an ever increasing selected minimum indicated measure of probability to quickly eliminate the majority of people who were observation subjects.

The cyber determining process disclosed herein may be utilized for determining the exact identity of a yet-to-be-identified person, even when there is no knowledge of who the person might be other than the designations that represent second series observations of the yet-to-be-identified person. For example, the cyber determining process may determine who a yet-to-be-identified person is by utilizing selected criteria that call for the most unique combination of recognized characteristics of the person to be utilized for searching available databases of first series observation records of known persons. This search may continue until either a specific known person is found that absolutely is the same person as the yet-to-be-identified person, or there are no further first series observation records of comparable known people from which to search and compare.

The cyber determining process disclosed herein may also utilize useful information from any source for providing determinations. Perhaps the most powerful of all information that may be utilized by the cyber determining process, when making determinations of identity of a person, would be information as to exactly who a yet-to-be-identified person might be. If the information that the cyber determining process utilizes is accurate, then comparison of only one specific person's first series observation records to the second series observation records of the yet-to-be-identified person may provide authentication of the reported identity of the yet-to-be-identified person.

Prior art cybersecurity measures fail to reliably control access to cyber resources because of their inability to accurately determine the exact identity of any person who is utilizing those cyber resources. The systems and methodologies of the present disclosure may provide cyber determinations of identity from a full spectrum of cyber determinations of identity as to whether a specific known person and a yet-to-be-identified person are the same person. At one farthest end of this range is the determination of identity that a yet-to-be-identified person and a specific known person absolutely are the same person. This determination of identity may be utilized to accurately grant only the known person access to his or her own personal and private cyber resources. Since unique behavioral or biological characteristics of the known person that can never be replicated by others were utilized for providing the determination of identity, then all others may be accurately excluded from ever gaining access to the cyber resources of the known person.

One of the greatest concerns of those who are skilled in the art of providing easy to use, biological-based determinations of identity of a person is that the utilized information comprising the cyber identity of a person may be stolen and then used fraudulently or maliciously. The scalable universal full spectrum cyber determining process of this disclosure provides cyber determinations of a person's identity, preferably by utilizing unique behavioral and biological characteristics of the person that can never be replicated by others. In many instances, a unique combination of a number of behavioral and biological characteristics of a person that are observed simultaneously or over one or more periods of time may be utilized for providing cyber determinations of identity.

Once again, looking to the future of humanity's use of cyber resources, there may come a time when humanity responsibly utilizes cyber resources as a tool to regularly augment each person's own natural cognitive and observational capabilities.

In order for a person to achieve the highest attainable levels of benefits from utilization of cyber resources for augmenting his or her own natural cognitive and observational capabilities, it is desirable to first provide the person with a relationship of access to utilized cyber resources that is almost identical to the relationship of access the person has with his or her own mind and senses.

Therefore, it is desirable that personal and private cyber information and resources be configured to where they can never be accessed by anyone other than the one specific person who is the proprietary user of the cyber resources. As an example, a person may not want to be hypnotized for the purpose of others using information from the privacy of the person's mind for any reason. The person may also not want anyone to gain access to his or her own personal and private cyber resources and information, including health records, financial information, geographical locating reports, cyber communications of all kinds, and cyber interactions of all kinds (including for commerce, education, entertainment, self-help, and so forth). Similarly, a person may not want anyone to gain access to all, or any part of, the person's private cyber resources and information post mortem, just as it is with the person's own natural cognitive resources.

Through use of the disclosed cyber determining process's determinations of identity and a point of cyber access computer, it may be possible, as it also is with a person's own natural capabilities, to share any selected portion of the person's own personal and private (cyber-based) information and resources with selected others.

One skilled in the art will appreciate that some of the methodologies disclosed herein may be implemented utilizing one or more software programs. Such software programs may take the form of suitable programming instructions disposed in a tangible, non-transient medium which, when implemented by one or more computer processors, perform part or all of the methodologies described herein.

While the disclosed scalable universal full spectrum cyber determining process has been defined in terms of its preferred and alternative embodiments, those of ordinary skill in the art will understand that numerous other embodiments and applications of the disclosed cyber determining process will become apparent. Such other embodiments and applications shall be included within the scope and meaning of the disclosure as defined by the appended claims. Moreover, it is to be understood that the above description of the present disclosure is illustrative, and is not intended to be limiting. It will thus be appreciated that various additions, substitutions and modifications may be made to the above described embodiments without departing from the scope of the present disclosure. Accordingly, the scope of the present disclosure should be construed in reference to the appended claims.

What is claimed is:

1. A scalable universal full spectrum cyber determining process, said scalable universal full spectrum cyber determining process comprising:

utilizing (a) at least one computing device (b) criteria selected from criteria that may be utilized by said cyber determining process, (c) selected information, (d) selected necessary programming, and (e) any other necessary resource, all of which being structured and utilized for providing at least one cyber determination;

wherein said at least one cyber determination is selected from the group consisting of a full spectrum of cyber determinations;

wherein said at least one cyber determination is utilized for at least one purpose selected from the group consisting of a full spectrum of purposes for which cyber determinations may be utilized;

wherein said information is derived from at least one member selected from the group consisting of (a) at one or more points in time, and (b) over at least one period of time;

wherein said information is selected from the group consisting of a full spectrum of useful information that may be utilized by said cyber determining process;

wherein said full spectrum of useful information that may be utilized by said cyber determining process may include information that was derived from at least one sensor observation;

wherein said at least one sensor observation provides information regarding at least one aspect of at least one subject of said at least one sensor observation;

wherein at least one cyber determination regarding said at least one subject of at least one sensor observation is selected from the group consisting of the full spectrum of cyber determinations regarding subjects of sensor observations;

wherein said at least one aspect of at least one subject of at least one sensor observation is selected from the group consisting of a full spectrum of observable aspects of subjects of sensor observations;

wherein said at least one subject of at least one sensor observation is selected from the group consisting of a full spectrum of subjects of sensor observations;

wherein said cyber determining process utilizes at least one observed characteristic regarding at least one aspect of said at least one subject of at least one sensor observation;

wherein said at least one observed characteristic is selected from the group consisting of a full spectrum of observable characteristics of subjects of sensor observations;

wherein said at least one sensor observation is at least one type of sensor observation selected from the group consisting of (a) visual sensor observations, (b) audible sensor observations, (c) thermal sensor observations, (d) olfactory sensor observations (e) tactile sensor observations, and (f) any other type of sensor observation selected from the group consisting of a full spectrum of types of sensor observations;

wherein said at least one sensor observation has at least one characteristic selected from the group consisting of a full spectrum of characteristics of sensor observations;

wherein each said scalable cyber determining process may be configured, in regard to included resources, to fall at one point in a range of from a minimum to a maximum, wherein at the minimum said cyber determining process includes only the resources that are needed for providing for a least complex, in regard to included necessary resources, of all cyber determination needs, and wherein at the maximum said cyber determining process includes all of the resources that are needed for providing every cyber determination from a full spectrum of cyber determinations;

wherein said scalable cyber determining process may determine and utilize at least one measure of adequacy of available resources;

wherein said scalable cyber determining process provides at least one determination selected from the group consisting of (a) at least one single cyber determination, (b) at least one intermittently provided cyber determination, and (c) at least one constantly provided cyber determination; and wherein said scalable cyber determining process further comprises utilizing at least one part of at least one step selected from the group consisting of (a) a first series observation step wherein said cyber determining process utilizes at least one sensor observation, wherein at least one subject of said at least one sensor observation has at least one previously determined aspect, said cyber determining process recognizing at least one characteristic regarding said previously determined aspect, said at least one recognized characteristic being utilizable by said cyber determining process in providing said at least one cyber determination, said cyber determining process assigning designations representing (i) said at least one observation, (ii) said at least one known aspect of said at least one observation subject, and (iii) said at least one observed characteristic, said cyber determining process including at least one of said designation in at least one first series observation record, (b) a second series observation step wherein said cyber determining process utilizes at least one sensor observation, wherein at least one subject of said at least one sensor observation has at least one yet-to-be-determined aspect, said cyber determining process recognizing at least one characteristic regarding said at least one yet-to-be-determined aspect, said cyber determining process assigning designations representing (i) said at least one observation, (ii) said at least one yet-to-be-determined aspect of said at least one observation subject, and (iii) said at least one characteristic regarding said at least one yet-to-be-determined aspect, wherein said cyber determining process including at least one of said designations in at least one second series observation record, (c) a matching step wherein said cyber determining process matching at least one designation from at least one second series observation record with at least one comparable designation from at least one first series observation record, (d) a comparing step wherein said cyber determining process comparing designations from at least one second series observation record with designations from at least one comparable first series observation record and providing at least one conclusion from the comparison, (e) a determining step wherein said cyber determining process utilizes at least one selected from the group of (i) said at least one conclusion from said at least one comparing step, and (ii) said useful information, for making said at least one cyber determination, and (f) a reporting step wherein said cyber determining process providing at least one report regarding at least one aspect of at least one part of at least one cycle of operation of said cyber determining process.

2. The cyber determining process of claim 1, wherein said scalable cyber determining process achieves at least one selected attainable level of accuracy goal for at least one cyber determination, and wherein said at least one attainable level of accuracy goal falls within a range extending from 0% accuracy up to, and including, 100% accuracy.

3. The cyber determining process of claim 1, wherein said cyber determining process provides for any possible level of observation participation by at least one person who is at least one subject of at least one sensor observation, and wherein said any possible level of observation participation ranges from said at least one person being present but not consciously or otherwise engaged in said at least one sensor observation, to said at least one person being an active and consciously engaged participant in said at least one sensor observation.

4. The cyber determining process of claim 1, wherein said cyber determining process utilizes at least one sensor observation selected from the group consisting of (a) at least one sensor observation which is of at least one characteristic of at least one observation subject, and which is observed at one or more points in time, and (b) at least one sensor observation which is of at least one characteristic of at least one observation subject, and which is observed over at least one period of time.

5. The cyber determining process of claim 4, wherein said at least one sensor observation occurs over said at least one period of time and includes observation of at least one change that occurs to at least one sensor observable aspect of at least one observation subject over said at least one period of time.

6. The cyber determining process of claim 5, wherein said at least one subject of at least one sensor observation includes at least one person being said at least one observation subject, and wherein said at least one change that occurs to said at least one observation subject is at least one change of at least one observable aspect of at least one part of at least one feature of said at least one person.

7. The cyber determining process of claim 6, wherein said at least one feature of said at least one person is selected from the group consisting of a head, face, mouth, eyes, eyebrows, nose, arms, hands, fingers, legs, feet, neck, torso, skin, heart, stomach, intestines, liver, kidneys, lungs, breath, vascular system, brain, spinal cord, neural system, skeleton, blood, and any other feature of a person selected from a full spectrum of features of a person where sensor observable changes occur.

8. The cyber determining process of claim 1, wherein at least one provided cyber determination includes the determination of any indicated measure that exists of at least one yet-to-be-identified person being a same person as one specific known person, wherein said at least one determination ranges from determining said yet-to-be-identified person absolutely is not said known person, through determining any intermediate indicated measure of probability that exists of said yet-to-be-identified person being said known person, to determining said yet-to-be-identified person absolutely is said known person.

9. The cyber determining process of claim 1, further comprising a repeating step in which said cyber determining process selects at least one part of at least one first series observation of at least one specific person for repetition by at least one yet-to-be-identified person, wherein said at least one yet-to-be-identified person performs said at least one repetition, wherein said cyber determining process assigns designations representing (a) said at least one observation, (b) said at least one repetition, and (c) at least one characteristic regarding said at least one yet-to-be-identified person.

10. The cyber determining process of claim 9, wherein said scalable cyber determining process includes at least one second series observation record of said at least one repetition, and wherein said at least one second series observation record includes said designations assigned by said cyber determining process.

11. The cyber determining process of claim 1, wherein said cyber determining process comprises searching and comparing available first series observation records of previously determined aspects of first series observation subjects until either every cyber determination goal has been achieved, or there are no further comparable first series observation records to search and compare.

12. The cyber determining process of claim 1, further comprising utilizing information which is derived from at least one source other than at least one member selected from the group consisting of (a) said at least one first series observation record, and (b) said at least one second series observation record.

13. The cyber determining process of claim 1, wherein said cyber determining process utilizes said at least one computing device, said selected criteria, said selected information, said selected programming, and said any other necessary resource, all of which being utilized for the purpose of accurately granting or denying access to at least one part of at least one resource selected from the group consisting of (a) said cyber determining process (b) at least one cyber resource that is being utilized by said cyber determining process, and (c) at least one resource that is utilizing said cyber determining process.

14. The cyber determining process of claim 1, further comprising:
said cyber determining process manipulating, in any way possible, the operations of at least one member selected from the group consisting of (a) said cyber determining process utilized resources, and (b) said cyber determining process itself; wherein said manipulating provides said cyber determining process with selection of possible utilizations, wherein said manipulating is utilized for at least one purpose.

15. The cyber determining process of claim 14, wherein said at least one purpose for utilizing said manipulating includes aiding in achieving at least one attainable cyber determination goal.

16. The cyber determining process of claim 1, wherein said cyber determining process further includes cyber determining process history, wherein said cyber determining process history includes at least one cyber determining process history record.

17. The cyber determining process of claim 1, wherein at least one observation record that was derived from at least one source other than said first series observation step being included as at least one first series observation record.

18. The cyber determining process of claim 1, wherein at least one observation record that was derived from at least one source other than said second series observation step being included as at least one second series observation record.

19. The cyber determining process of claim 1, wherein all or any part of the operations of said cyber determining process are performed in any order.

20. The cyber determining process of claim 1, wherein said cyber determining process includes at least one standard cyber determining process designation representing at least one aspect of at least one operation of said cyber determining process.

21. A scalable, full spectrum cyber determining process, comprising:
deriving information, from at least one point in time or over at least one period of time, from a spectrum of information that includes at least one observed characteristic of at least one subject of at least one sensor observation, thereby obtaining derived information, wherein said at least one sensor observation is a type of sensor observation selected from the group consisting of (a) visual sensor observations, (b) audible sensor observations, (c) thermal sensor observations, (d) olfactory sensor observations, and (e) tactile sensor observations;
said cyber determining process providing at least one cyber determination through the utilization of (a) at least one computing device (b) criteria that may be utilized by said cyber determining process, (c) said derived information, and (d) any necessary programming and resources, wherein said cyber determining process provides at least one cyber determination selected from the group consisting of (i) at least one single cyber determination, (ii) at least one intermittently provided cyber determination, and (iii) at least one constantly provided cyber determination; and
said at least one cyber determination being utilized for at least one purpose;
wherein said scalable cyber determining process further comprises utilizing at least one part of at least one step selected from the group consisting of
(a) a first series observation step utilizing at least one sensor observation, wherein at least one subject of said at least one sensor observation has at least one previously determined aspect, said cyber determining process recognizing at least one characteristic regarding said previously determined aspect, said at least one recognized characteristic being utilizable by said cyber determining process in providing said at least one cyber determination, said cyber determining process assigning designations representing (i) said at least one observation, (ii) said at least one known aspect of said at least one observation subject, and (iii) said at least one observed characteristic, said cyber determining process including at least one of said designations in at least one first series observation record, (b) a second series observation step utilizing at least one sensor observation, wherein at least one subject of said at least one sensor observation has at least one yet-to-be-determined aspect, said scalable cyber determining process recognizing at least one characteristic regarding said at least one yet-to-be-determined aspect, said cyber determining process assigning designations representing (i) said at least one observation, (ii) said at least one yet-to-be-determined aspect of said at least one observation subject, and (iii) said at least one characteristic regarding said at least one yet-to-be-determined aspect, wherein said cyber determining process including at least one of said designations in at least one second series observation record, (c) a matching step matching at least one designation regarding at least one subject from at least one second series observation record with at least one comparable designation regarding at least one comparable subject from at least one first series observation record, (d) a comparing step comparing designations from at least one second series observation record with designations from at least one comparable first series observation record, and providing at least one conclusion from the comparison, (e) a determining step wherein said cyber determining process utilizes at least one from the group of (i) said at least one conclusion from said at least one comparing step, and (ii) said information, for making said at least one cyber determination, and (f) a reporting step providing at least one report regarding at least one aspect of at least one part of at least one cycle of utilization of said cyber determining process.

* * * * *